(12) United States Patent
Cuomo et al.

(10) Patent No.: US 10,997,142 B2
(45) Date of Patent: *May 4, 2021

(54) COGNITIVE BLOCKCHAIN AUTOMATION AND MANAGEMENT

(71) Applicant: International Business Machines Corporation, Armonk, NY (US)

(72) Inventors: Gennaro A. Cuomo, Durham, NC (US); Donna N. Dillenberger, Yorktown Heights, NY (US); Rong Liu, Sterling, VA (US); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,462

(22) Filed: Sep. 9, 2019

(65) Prior Publication Data
US 2020/0005189 A1    Jan. 2, 2020

Related U.S. Application Data

(63) Continuation of application No. 15/462,877, filed on Mar. 19, 2017, now Pat. No. 10,452,998.

(51) Int. Cl.
*H04L 29/06* (2006.01)
*G06F 16/22* (2019.01)
(Continued)

(52) U.S. Cl.
CPC ........ *G06F 16/2255* (2019.01); *G06F 21/645* (2013.01); *G06N 20/00* (2019.01);
(Continued)

(58) Field of Classification Search
CPC ..... G06N 20/00; G06F 21/645; H04L 9/3236; H04L 9/3297; H04L 2209/38; H04L 2209/56
See application file for complete search history.

(56) References Cited

U.S. PATENT DOCUMENTS 10,095,888 B1    10/2018   Lee et al.
10,158,479 B2    12/2018   Chapman et al.
(Continued)

FOREIGN PATENT DOCUMENTS

CN    105718516 A    6/2016
CN    105976231 A    9/2016
(Continued)

OTHER PUBLICATIONS

List of IBM Patents or Patent Applications Treated as Related, Oct. 10, 2019.
(Continued)

*Primary Examiner* — Yogesh Paliwal (57) ABSTRACT

A blockchain of transactions may be referenced for various purposes and may be later accessed by interested parties for ledger verification and information retrieval. One example method of operation may include identifying one or more analytic processes to process blockchain data, determining a primary type of data analytic to be performed by the one or more analytic processes, selecting a type of data store to use for performing the one or more data analytic processes based on the primary type of data analytic, accessing the blockchain data, applying the one or more analytic processes, and storing results of the applied analytic processes in a database, file or dashboard. The analytic data may be realized in any manner or preference requested.

20 Claims, 4 Drawing Sheets

(51) Int. Cl.
*G06N 20/00* (2019.01)
*H04L 9/32* (2006.01)
*G06F 21/64* (2013.01)

(52) U.S. Cl.
CPC .......... *H04L 9/3236* (2013.01); *H04L 9/3297* (2013.01); *H04L 2209/38* (2013.01)

(56) References Cited

U.S. PATENT DOCUMENTS

| | | | |
|---|---|---|---|
| 10,298,395 | B1 | 5/2019 | Schiatti et al. |
| 2004/0083395 | A1 | 4/2004 | Blechman |
| 2008/0065436 | A1 | 8/2008 | Ziade et al. |
| 2011/0093324 | A1 | 4/2011 | Fordyce, III et al. |
| 2015/0134694 | A1 | 5/2015 | Burke et al. |
| 2016/0267474 | A1 | 9/2016 | Lingham et al. |
| 2016/0342978 | A1 | 11/2016 | Davis et al. |
| 2017/0011392 | A9 | 1/2017 | Lingham et al. |
| 2017/0053295 | A1* | 2/2017 | Tiell ............ G06Q 30/0631 |
| 2017/0093923 | A1* | 3/2017 | Duan ............ G06F 11/2028 |
| 2017/0243193 | A1 | 8/2017 | Manian et al. |
| 2017/0286880 | A1 | 10/2017 | Wiig et al. |
| 2017/0344988 | A1 | 11/2017 | Cusden et al. |
| 2018/0040073 | A1 | 2/2018 | Ghosh et al. |
| 2018/0068130 | A1 | 3/2018 | Chan et al. |
| 2018/0102952 | A1 | 4/2018 | Gopalakrishnan et al. |
| 2018/0129958 | A1 | 5/2018 | Saxena et al. |
| 2018/0137465 | A1 | 5/2018 | Batra et al. |
| 2018/0181768 | A1 | 6/2018 | Leporini et al. |
| 2018/0189753 | A1 | 7/2018 | Konda et al. |
| 2018/0225640 | A1 | 8/2018 | Chapman et al. |
| 2018/0225660 | A1 | 8/2018 | Chapman et al. |
| 2018/0227116 | A1 | 8/2018 | Chapman et al. |
| 2018/0343306 | A1 | 11/2018 | Lotter et al. |

FOREIGN PATENT DOCUMENTS

| | | |
|---|---|---|
| CN | 106296382 A | 1/2017 |
| CN | 106326437 A | 1/2017 |
| CN | 106330431 A | 1/2017 |
| CN | 106357612 A | 1/2017 |
| CN | 106372240 A | 2/2017 |
| CN | 106445993 A | 2/2017 |
| CN | 106453407 A | 2/2017 |
| CN | 106506203 A | 3/2017 |
| GB | 2540975 A | 2/2017 |
| JP | 2008065828 A | 3/2008 |
| JP | 2014215912 A | 11/2014 |
| WO | 2015175722 A1 | 11/2015 |

OTHER PUBLICATIONS

G. Cuomo et al., "Cognitive Blockchain Automation and Management", U.S. Appl. No. 15/462,877, filed Mar. 19, 2017.
International Search Report and the Written Opinion, PCT/IB2017/057678, dated Dec. 6, 2017.
International Search Report and Written Opinion, PCT/IB2017/057602, dated Mar. 19, 2018.
International Search Report and Written Opinion, PCT/IB2017/057676, dated Apr. 28, 2018.
Notice of Reasons for Refusal issued in the Corresponding JP Application No. 2019-549401, drafted on Dec. 24, 2020 by Patent Examiner Hideto Hara.

* cited by examiner

COGNITIVE BLOCKCHAIN AUTOMATION AND MANAGEMENT

TECHNICAL FIELD

This application relates to data analytic processing in the blockchain, and more particularly, to identifying analytic requirements and generating a blockchain processing configuration according to customized requirements.

BACKGROUND

The blockchain may be used as a public ledger to store any type of information. Although, primarily used for financial transactions, the blockchain can store any type of information including assets (i.e., products, packages, services, status, etc.). The blockchain may be used to securely store any type of information in its immutable ledger. Decentralized consensus is different from the traditional centralized consensus, such as when one central database used to rule transaction validity. A decentralized scheme transfers authority and trusts to a decentralized network and enables its nodes to continuously and sequentially record their transactions on a public "block," creating a unique "chain" referred to as the blockchain. Cryptography, via hash codes, is used to secure the authentication of the transaction source and removes the need for a central intermediary.

Since blockchain is a permissioned distributed data system, designed with strict privacy and security control, it is not easy to create analytics which provides insight for multiple parties. For example, questions raised by interested parties, such as, for example, how a party's business transactions and behaviors are as compared with other parties, may be answered by examining data in the blockchain and determining outliner/abnormal patterns of a party compared with other parties.

Most conventional configurations are designed to assume that data is relatively centralized with either full or less restrictive permissions. Analytics can be calculated from the data without any constraints. Most analytic approaches focus on data driven concerns, and blockchain combines data with certain characteristics, smart contracts, participants and other features. The blockchain offers a unique combination of characteristics conducive for creation of a "cognitive layer" as part of curated timestamped data that is both current and historical. However, such a combination of data creates new complexities in terms of exposing the data to coherent, consistent and machine learning and/or other processes.

SUMMARY

One example method of operation may include identifying one or more analytic processes to process blockchain data, determining a primary type of data analytic to be performed by the one or more analytic processes, selecting a type of data store to use for performing the one or more data analytic processes based on the primary type of data analytic, accessing the blockchain data, applying the one or more analytic processes, and storing results of the applied analytic processes in a database, file or dashboard.

Another example embodiment may include an apparatus that provides a processor configured to identify one or more analytic processes to process blockchain data, determine a primary type of data analytic to be performed by the one or more analytic processes, select a type of data store to use for the one or more data analytic processes based on the primary type of data analytic, access the blockchain data, apply the one or more analytic processes, and store results of the applied analytic processes in a database, file or dashboard.

Another example embodiment may include a non-transitory computer readable storage medium configured to perform identifying one or more analytic processes to process blockchain data, determining a primary type of data analytic to be performed by the one or more analytic processes, selecting a type of data store to use for performing the one or more data analytic processes based on the primary type of data analytic, accessing the blockchain data, applying the one or more analytic processes, and storing results of the applied analytic processes in a database, file or dashboard.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a blockchain and a corresponding blockchain network of peer devices or registered accounts which may be part of a private "consortium". The enrolled/registered members of the blockchain consortium can provide/share/change/upload/download analytics to all enrolled members of the consortium in various ways. For example, predefined built-in analytics, such as aggregated metrics may be shared to all members without disclosing information regarding specific parties. For instance, an average price from all available parties may be obtained for a particular commodity or well-known and common product or service. Such information could be readily available to government agencies for integrity mapping. For example, the Federal Trade Commission (FTC) may be concerned with unfair business practices or price-fixing of products for antitrust concerns. The dates, times, quantities, etc., of a product sold can quickly be ascertained and mapped to identify anomalies leading to suspected candidates in such a configuration. Custom analytics across various parties to the blockchain can be obtained through explicit permission control constructs, such as comparing one's own product price to those of others to arrive at a graph or visualization of all such relevant data.

In this configuration, the blockchain and the network of blockchain members or peers may be part of an assigned "consortium" or membership group that embodies all such members as privileged parties which can access their data and the data of others, according to their privilege status. Such a configuration can provide analytics across parties with explicit permission control. A user's analytic requirements may contain metrics from various types of data requirements. Once retrieved, the analytics may be created and displayed in a dashboard, which may also be customized according to predetermined criteria, user account profile preferences or other preferences which are referenced and utilized to display such dashboard data.

Example embodiments may also provide a trusted ledger, such as a blockchain, that has internalized or custom configuration type built-in analytics with explicit "analytics level" permission control (e.g., privacy preserving access). Analytics regarding particular aggregated behaviors can be used for analytic purposes and shared with enrolled parties to the blockchain. Analytics can be designed as a type of "transaction" and parties can request with permission control. In general, the blockchain may provide a pool of timestamped data, current and historical state data and ledger data, cross-partner/cross-organizational data, a log of processes, strong identities, and the data is already agreed upon and trusted data that does not require verification. The analytic data approach, according to example embodiments, provides an automated mechanism for generating solution-specific analytical solutions that leverage the blockchain specification and produce end-to-end customizable analytics.

Figure 1:
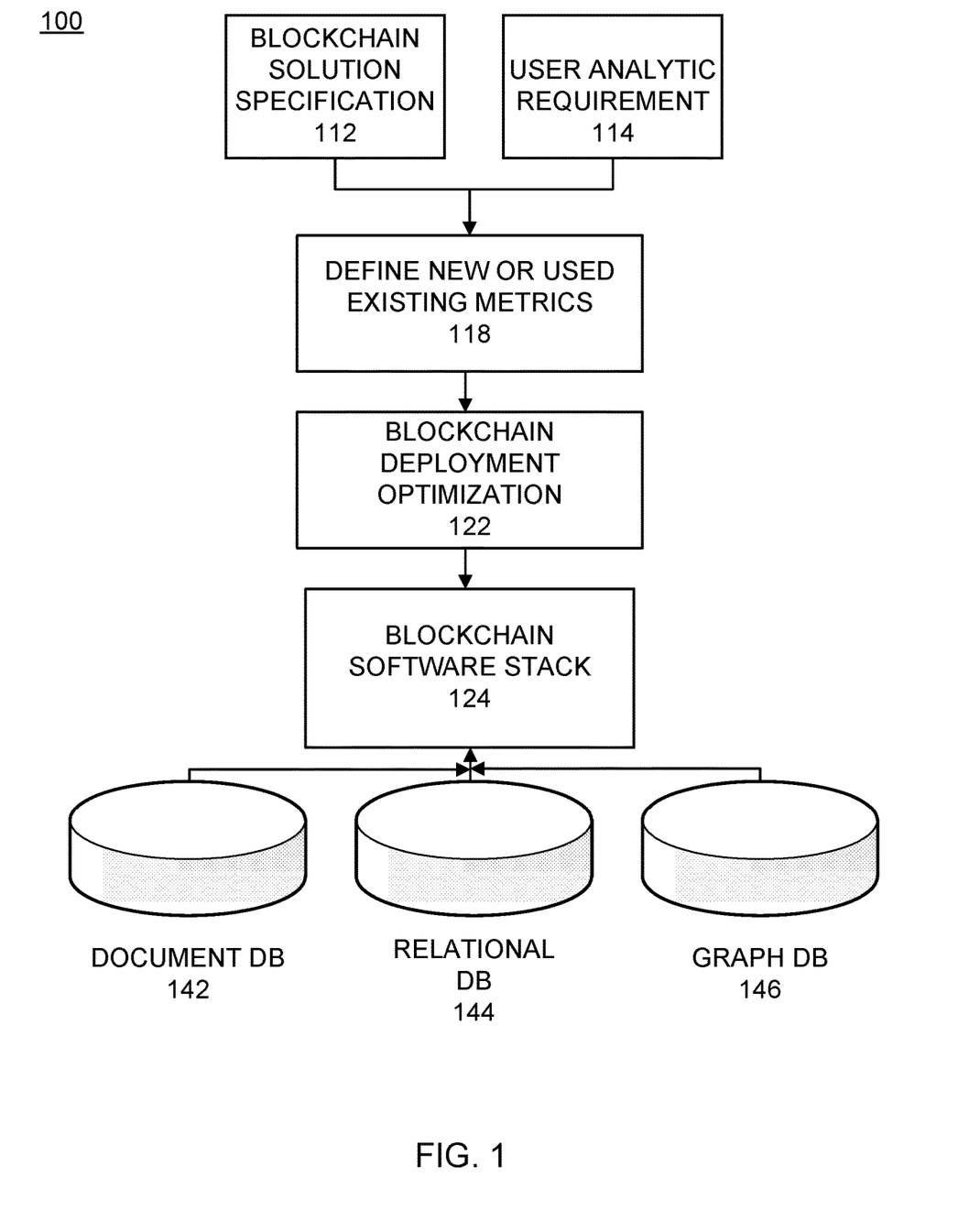
FIG. 1 illustrates a logic diagram of a multi-process blockchain analytic data model, according to example embodiments.

FIG. 1 illustrates a logic diagram of a multi-process blockchain analytic data model, according to example embodiments. Referring to FIG. 1, the configuration 100 includes a process by which a blockchain solution specification 112 is combined with a user analytic requirement 114 to produce analytic data. In this approach, the request for analytic data may require a permission confirmation to grant analytic permissions prior to mining data and producing intelligible results. New metrics or used metrics are defined 118 and a metric specification may be created, which is used to process retrieved data by topic, category, parameter, etc. The query and aggregate data and other metrics are then produced based on index data and various data sources. The blockchain data or external data may be a databank of available data for the querying operations. The built-in analytics and custom analytic libraries may be stored in a blockchain system configuration and retrieved and processed for each data request received. The result includes notifications, display data/visualization data and other analytic data which may be forwarded to a user dashboard.

The metrics defined may be deployed to a blockchain optimization function 122, which may determine which blockchain software stack 124 to select, if any, and which data bank type to implement to perform the analytic processes requested. For instance, if the analytic processes are identified as being primarily graphs, files or other documents, then the appropriate data store can be selected and used to perform the analytics. For example, if there are documents which needed to be referenced then the document DB 142 may be setup. Also, if the database requirements include a need for a relational DB then the relational DB 144 may be implemented to perform the data analytic processes. In the event that the analytic requirements require various graphs, then the graph DB 146 may be setup and used to store the analytic processes and related blockchain data. The most likely file type to be exploited in the data analytics may correlate to the type of database selected for such a file type(s) (e.g., data files, graph files, large files, small files, image files, video files, etc.). When selecting a datastore type there are rules in the blockchain run time that match the datastore to the analytics that will be used. For example, if "identity analytics" are requested, then a graph DB will be used. If "classification analytics" are required, then a 'SPARK' DB may be used. Further, performance information is collected on how the analytics are performing, such as memory, CPU and other computing performance concerns, and that performance information will also be used to select a datastore type.

In FIG. 1, the system configuration is integrated with a blockchain runtime and includes auto-created data connectors, querying and data retrieval mechanisms, auto-generated analytical modules, and auto-generated customizable dashboards. The privileged access grant may provide restricted access for purposes of creating particular analytics, which may be desired in accordance with privacy concerns/preferences of the participating parties. In one example, a blockchain participant may be willing to offer data for only aggregate level time series analytics (e.g., aggregated by hour, type of product, etc.), for a specified timeframe (e.g., last 24 hours, 7 days, 30 days, etc.,), and not willing to disclose any individual transaction level information other than the aggregations of data. The transaction data may be parsed per the security requirements so raw data is extracted from the transactions and administrative and business related data may be omitted to avoid security violations. A participant in the blockchain consortium may not be willing to provide their data for any clustering and predictive modeling purposes. The user may restrict access to their data based on the consortium rules and their own user account preferences.

User analytics requirements are defined as metrics based on a blockchain specification, including an asset data structure, smart contracts/transaction types, parties, and a security model which fully observes analytics level permissions. Attributes needed for metrics calculation are indexed in the blockchain/external data sources. The indexed data may be data which all participants have agreed to provide for particular types of analytics desired by other members and certified third parties. Parameterized queries of the indexed data are created to compute metrics for display purposes. Certain built-in functions for commonly used blockchain analytics may include count transactions, sum asset values, time series analysis of transaction(s), anomaly detection of transactions, etc.

A configurable dashboard may be used to display metrics in various styles including but not limited to a pie, line, map etc. A blockchain configuration may contain the following data elements, smart contracts, transaction types, an asset data model, parties with strong identities and a security/permission model, time stamped data regarding records and processes. The analytics can be defined based on a specification, such as a time series/trending analysis for data with a timestamp (e.g., transactions, asset updates, etc.). One example may seek to identify an asset/transaction pattern, anomalies, patterns regarding how assets are used/updated through transactions, including intervals, frequencies, parties, etc. Also, other analytic considerations include anomalies as compared to established patterns, common behaviors across parties or individual behaviors compared with other parties including a rank of a party by some asset value (i.e., cheapest product), transaction volume, etc.

Built-in metrics which do not disclose information regarding specific parties, the blockchain network configuration can compute and store those metrics in a database. Permissioned parties can query the metrics through query transactions. For metrics involving specific parties, smart contracts are created and then an approval is obtained from all parties. Smart contract creation and access to blockchain data approval can be generated using blockchain application creation tools, for example, a fabric composer. Data with timestamps can permit a time series analysis, such as a seasonality pattern, anomaly detection, forecast, etc. Also, since all history data (i.e. "ledger") cannot be changed once committed to the blockchain, analytics computed from such data is authoritative and can be trusted. For example, a user set of objectives may be a set of metrics being identified. As shown in the excel table, each metric is further decomposed into attributes needed. If a metric can be provisioned from built-in analytics, the data attributes are retrieved by a blockchain component (e.g., analytics engine). If the metric can only be obtained through a smart contract, then it follows the smart contract invocation procedure to obtain the data. A query may be an API or a program that is instructed to perform some calculation. For example, if a party queries for an average freight cost per a given region, it can issue a query with parameters such as the following:

```
{
    dataindex: " shipment_freightcost_region" (attributes needed for this metric have been indexed, or collected),
        startdate: [2017, 2, 1],
        endend: [2017, 3, 1]
        reduce_fun: reduce_avg
}.
```

In this example, when the API receives the above-noted query statement, it retrieves data from the 'dataindex', applies a date range filter, and then applies the 'reduce_fun' function, which can be predefined or user-defined. The dates, the variables and other parameters are defined to identify an average off all the available freight cost information. The analytics generated may place a numerical indicator on a graph next to an industry standard so the amount of deviation can be readily identified and shared with interested parties. One approach would be to auto-complete a notification. For example, if a vice president of operations is interested in knowing when any costs of the company exceed the industry standard by more than 10 percent, the analytics could be generated and compared to the threshold percentage (0.10) and if the threshold is exceeded (more than 0.10), then a notification may be sent to alert all interested parties so the numbers can be reduced by manual modifications to the supply chain based on automated data.

An example metric configuration may be defined as the average freight cost per shipment to each country in a 30-day period. Another concern may be the rank of the business as part of the average freight cost per shipment among all carriers within the same geography in a 30 day period. Each metric may be defined as a {key, value} pair, where the key and value may be a composite with a map metric (key, value) pair to attributes, and which may define a key/value/filter data specification. The key/value/filter specifies how data is going to be retrieved from the blockchain data. Also, a determination may be made to determine the permission construct, such as a built-in analytics model and/or a smart contract to the blockchain. In the example where the permission construct is a "built-in analytics", a query is provided with appropriate parameters to retrieve the metrics. For example, query (Q1) will not disclose any specific party information (i.e., no business names). This metric can be calculated periodically and stored in the blockchain for the enrolled party to query. A party can invoke the general "query" smart contract with the provided parameters to retrieve the analytics. The metric calculation function may be 'reduce_avg' for each key, count the first component in the value, sum the 2nd component in the value, and then divide the sum by the count to reach the average.

If a permission construct is a "smart contract", a smart contract is generated based on the key/value/filter data specification, metric calculation specification, and query specification. Also, the necessary permissions need to be granted to deploy/execute the smart contract. For example, query (Q2) may involve a specific party and other parties. A smart contract can be generated to ensure this metric can be generated for the proper identity by ensuring the validated party has such access and those parties without validation do not have that authority.

An example smart contract may include a query to built-in analytics. An example may be:

```
public String query(ChaincodeStub stub, String function, String[ ] args) {
    Psudo code:
    String[ ] array specify parameters needed to retrieve the built-in analytics,
    e.g.
        {
            dataindex: " shipment_freightcost_region" (attributes
            needed for this metrics have been indexed),
                startdate: [2017, 2, 1],
                endend: [2017, 3, 1]
                reduce_fun: reduce_avg
        }
    User permission is verified. After verification, the built-in metrics
    within specific date range are returned }.
For a custom analytics approach, an example may be:
    public String compute_metrics (ChaincodeStub stub, String
    function, String[ ] args) {
        Psudo code:
        String[ ] array specify metric specification parameters, e.g.
    key/value/filters
        Obtain approval to access key/value/filter attributes data
        Calculate metrics based on the logic defined in metric specification
        Return metrics
    }.
```

Document databases 142 are used to store documents, typically in JSON or XML, format. Their support for data associations is relatively weak. Graph database 146 provide support for entities (nodes) and their associations (edges). As such, they are good for storing items that are naturally represented by a graph, such as a social network or other graph type data. Relational databases 144 store structured data and associations in tables. A relational DB 144 can process almost any database need, but may not be the most efficient if the concern is limited to one of the categories above (i.e., documents/graphs/oriented data). If the data analytic requests can be pre-processed and associated with a specific data requirement, then the DB that is setup on-the-fly may provide optimum data process results.

In one example, the types of analytics may be primarily temporal aggregations leveraging built-in arithmetic functions (e.g., average, min, max, etc.) combined with top-N ranking and with spatial-temporal analytics. There are multiple possible data stores that can support such types of analytics. In another example, compliance detection may be used, depending on the specific type of detection, for querying and possibly a reasoning technique, and various different data stores may be suitable. A relational data store would be used if the compliance detection is based on scanning and retrieval of large volumes of transactions. If some form of reasoning logic is also required then the graph or a triple data store may be used.

A blockchain data store may be provisioned since different types of data stores are more optimal for different analytic types. For example, graph datastores are optimal for relationship analytics, relational datastores are optimal for query analytics, datastores that plug into analytic libraries are optimized for machine learning libraries. A blockchain datastore is provisioned when the blockchain is created by blockchain cloud services. Once the datastore selections are determined, a container size and processes are selected based on the amount of blockchain data that is on the blockchain, the number of processors that are provided for the blockchain and the analytics that will be used. Additionally, the container size is determined based on historical data from similar blockchain efforts. For example, even though for a new analytic configuration, the exact volume of transactions may not be known, other similar configurations may provide such information based on the same domain, or based on the type of applied analytics, etc.

A blockchain software stack is provisioned by blockchain cloud services whenever users request new blockchain software stack instances, for example, a blockchain node or a blockchain peer. The analytics and blockchain datastore, containers, and processes are identified by the blockchain run time by the user informing the blockchain run time what data for which the user would like to find patterns and trends. This can be accomplished in different ways, for example, one possible way is leveraging an "analytics specification", which defines the types of analytics needed, which in turn can be used to determine the types of analytics components, which, in turn, can be used to determine the types of runtime environments which are efficient for the requested analytics on blockchain. The setup procedure starts with the user identifying the blockchain data for which they would like to find patterns, anomalies, and trends. This information then informs the blockchain run time what analytics are required, which informs the run time as to what datastore to provision (relational, graph, or document), and what virtual machines and containers to create to run the analytics. The best datastore for analytics is determined from predefined configuration rules and self-modified by a software component that examines historical and current performance data of the blockchain cloud to determine the best datastore for analytics.

Figure 2:
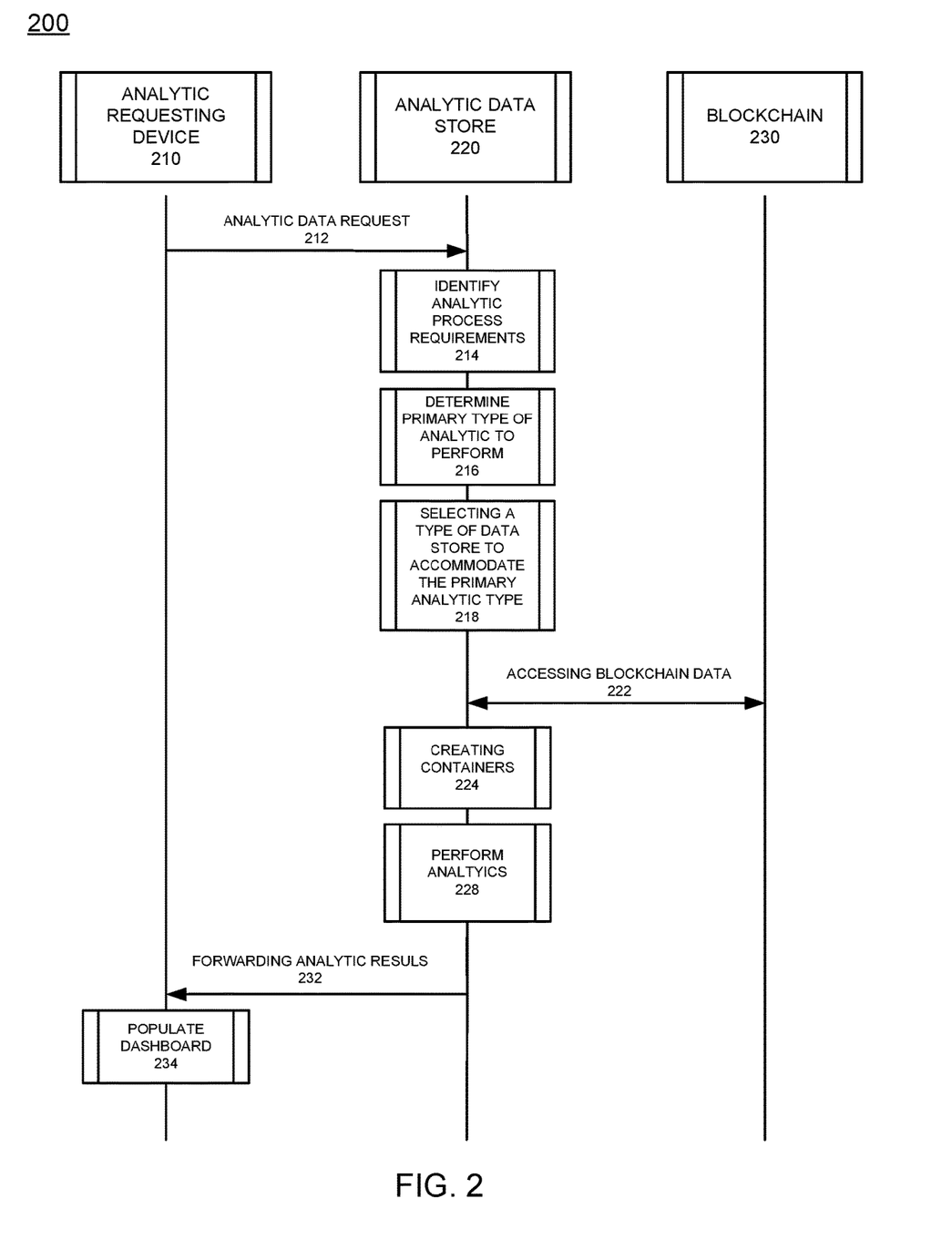
FIG. 2 illustrates a system signaling diagram of the interactions between a user device and a blockchain analytic configuration, according to example embodiments.

FIG. 2 illustrates a system signaling diagram of the interactions between a user device and a blockchain analytic configuration, according to example embodiments. Referring to FIG. 2, the example system configuration 200 includes an analytic requesting device 210, an analytic data store 220 which will be assigned to process the analytics and a blockchain 230. In this example, the initial request for an analytic data may be received as a request 212. The data store 220 may be assigned 218 to perform data analytics once the process requirements are known 214 and a primary purpose or main objective of the analytics are determined 216. This may be determined to a type of analytic selected, such as files, graphs, etc., or a derivation may be made based on a type and/or list of data selected. Comments in the analytic request may also be identified and used to determine a purpose. Once the data store type is selected, other features may include accessing the blockchain 222 for data, selection of a container(s) 224 for managing the processes and analytics performed to the data, next analytics may be performed 228 using the containers and the blockchain data for data realization. The results may be forwarded to the end user or display device for realization purpose 232 via a dashboard interface 234.

Figure 3:
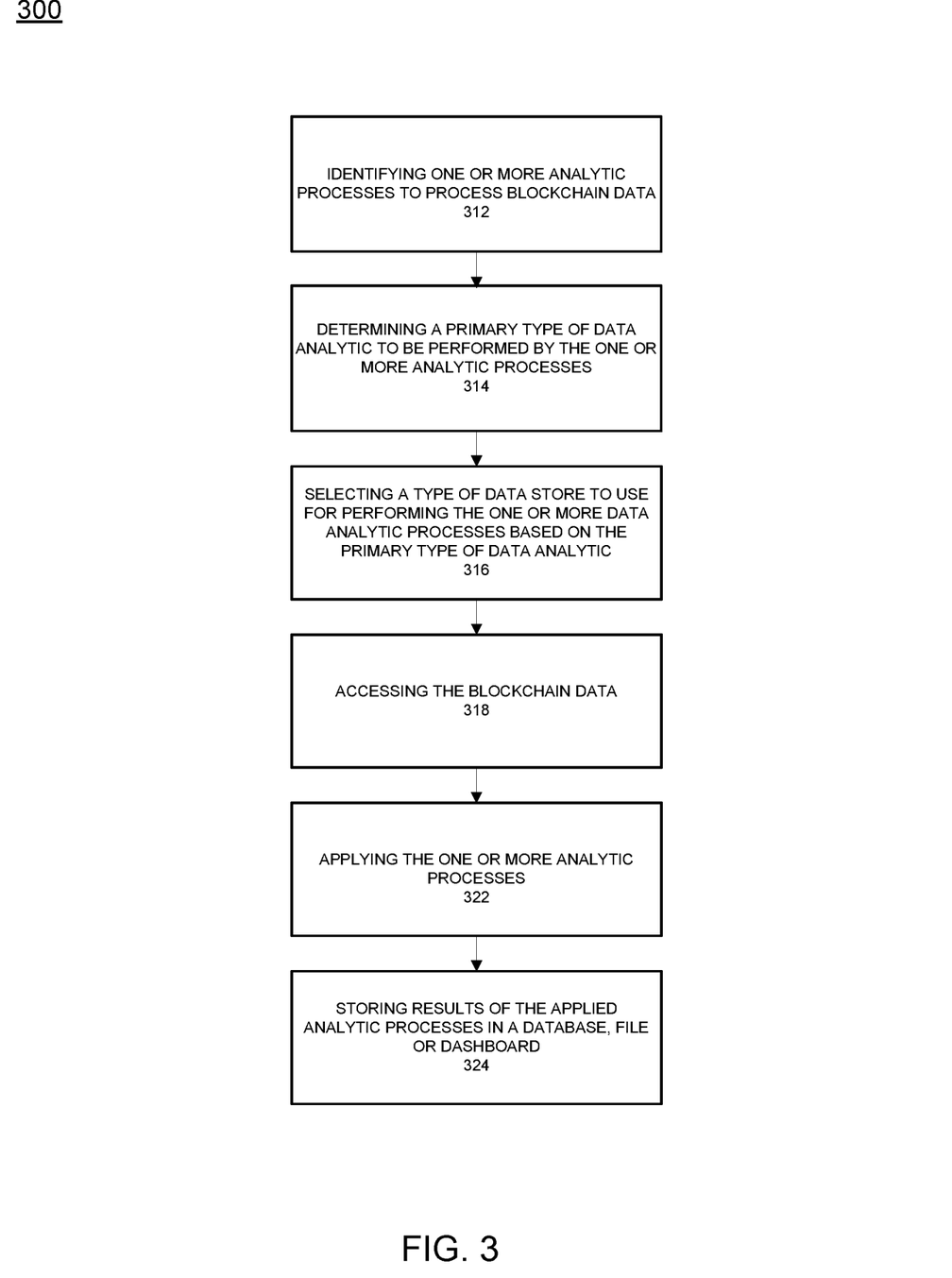
FIG. 3 illustrates a flow diagram of an example method of performing data analytics on blockchain data according to example embodiments.

FIG. 3 illustrates a flow diagram of an example method of performing data analytics on blockchain data, according to example embodiments. Referring to FIG. 3, the method 300 may include identifying one or more analytic processes to process blockchain data 312, determining a primary type of data analytic to be performed by the one or more analytic processes 314, selecting a type of data store to use for performing the one or more data analytic processes based on the primary type of data analytic 316, accessing the blockchain data 318, applying the one or more analytic processes 322, and storing results of the applied analytic processes in a database, file or dashboard 324. The data realization model may be any type of data reporting procedure including a notification, a message a graph, etc.

The method may also include creating one or more containers, and selecting at least one of the one or more analytic processes to be processed via the one or more containers, and determining an amount of memory and processor usage required to process the analytic processes. The method may also include creating one or more virtual machines or using the one or more containers to execute the one or more analytic processes based on the determined amount of memory and the processor usage required to process the one or more analytic processes. The method may also provide accessing one or more of an asset structure data, smart contracts, transactions types, transaction parties and security data on the blockchain, and creating results of the applied analytic processes based on one or more of the asset structure data, the smart contracts, the transactions types, the transaction parties and the security data on the blockchain, and provisioning the selected type of data store for the blockchain data that is matched to perform the one or more analytic processes. The primary type of data analytic may include one or more of a graph data analytic and a file retrieval data analytic.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
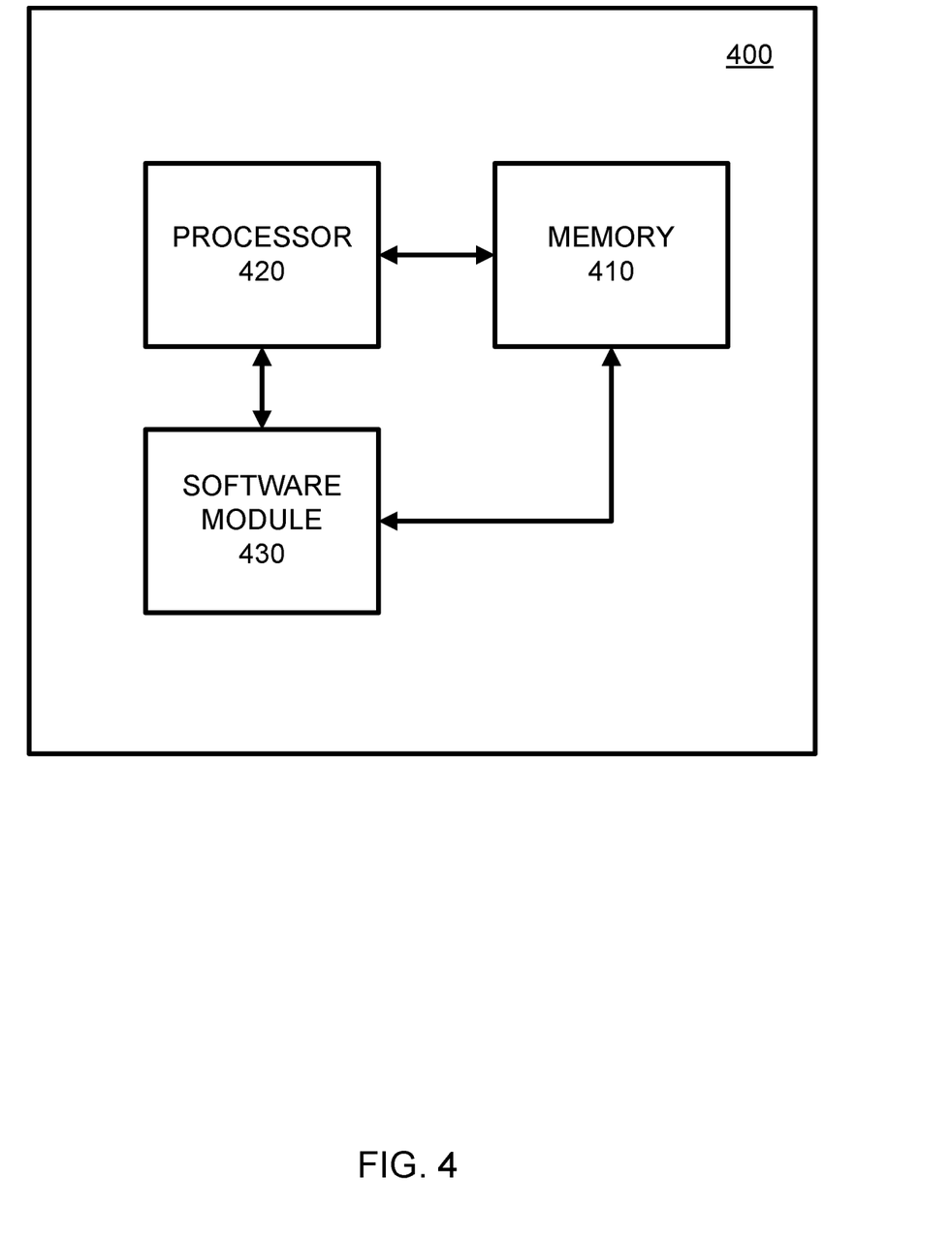
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   selecting a type of data store to use for performing one or more data analytic processes based on one or more predefined rules for configuring a blockchain and information regarding computing performance of the blockchain;

applying the one or more analytic processes to data on the blockchain; and storing results of the applied analytic processes in a database, file or dashboard.

2. The method of claim 1, further comprising:
creating one or more containers; and
selecting at least one of the one or more analytic processes to be processed via the one or more containers.

3. The method of claim 2, further comprising:
determining an amount of memory and processor usage required to process the analytic processes.

4. The method of claim 3, further comprising:
creating one or more virtual machines or using the one or more containers to execute the one or more analytic processes based on the determined amount of memory and the processor usage required to process the one or more analytic processes.

5. The method of claim 1, further comprising:
accessing one or more of an asset structure data, smart contracts, transactions types, transaction parties and security data on the blockchain; and
creating results of the applied analytic processes based on one or more of the asset structure data, the smart contracts, the transactions types, the transaction parties and the security data on the blockchain.

6. The method of claim 1, further comprising:
provisioning the selected type of data store for the blockchain data that is matched to perform the one or more analytic processes.

7. The method of claim 1, further comprising:
identifying one or more analytic processes to process blockchain data.

8. An apparatus, comprising:
a hardware-implemented processor configured to:
select a type of data store to use for performing one or more data analytic processes based on one or more predefined rules for configuring a blockchain and information regarding computing performance of the blockchain;
apply the one or more analytic processes to data on the blockchain; and
store results of the applied analytic processes in a database, file or dashboard.

9. The apparatus of claim 8, wherein the hardware-implemented processor is further configured to:
create one or more containers, and
select at least one of the one or more analytic processes to be processed via the one or more containers.

10. The apparatus of claim 9, wherein the hardware-implemented processor is further configured to:
determine an amount of memory and processor usage required to process the analytic processes.

11. The apparatus of claim 10, wherein the hardware-implemented processor is further configured to:
create one or more virtual machines or using the one or more containers to execute the one or more analytic processes based on the determined amount of memory and the processor usage required to process the one or more analytic processes.

12. The apparatus of claim 8, wherein the hardware-implemented processor is further configured to:
access one or more of an asset structure data, smart contracts, transactions types, transaction parties and security data on the blockchain, and
create results of the applied analytic processes based on one or more of the asset structure data, the smart contracts, the transactions types, the transaction parties and the security data on the blockchain.

13. The apparatus of claim 8, wherein the hardware-implemented processor is further configured to:
provision the selected type of data store for the blockchain data that is matched to perform the one or more analytic processes.

14. The apparatus of claim 8, wherein the hardware-implemented processor is further configured to:
identify one or more analytic processes to process blockchain data stored in a blockchain.

15. A non-transitory computer readable storage medium configured to store at least one instruction that when executed by a processor causes the processor to perform:
selecting a type of data store to use for performing one or more data analytic processes based on one or more predefined rules for configuring a blockchain and information regarding computing performance of the blockchain,
applying the one or more analytic processes to data on the blockchain; and
storing results of the applied analytic processes in a database, file or dashboard.

16. The non-transitory computer readable storage medium of claim 15, further configured to store at least one instruction that when executed by the processor causes the processor to perform:
creating one or more containers; and
selecting at least one of the one or more analytic processes to be processed via the one or more containers.

17. The non-transitory computer readable storage medium of claim 16, further configured to store at least one instruction that when executed by the processor causes the processor to perform:
determining an amount of memory and processor usage required to process the analytic processes.

18. The non-transitory computer readable storage medium of claim 17, further configured to store at least one instruction that when executed by the processor causes the processor to perform:
creating one or more virtual machines or using the one or more containers to execute the one or more analytic processes based on the determined amount of memory and the processor usage required to process the one or more analytic processes.

19. The non-transitory computer readable storage medium of claim 15, further configured to store at least one instruction that when executed by the processor causes the processor to perform:
accessing one or more of an asset structure data, smart contracts, transactions types, transaction parties and security data on the blockchain; and
creating results of the applied analytic processes based on one or more of the asset structure data, the smart contracts, the transactions types, the transaction parties and the security data on the blockchain.

20. The non-transitory computer readable storage medium of claim 15, further configured to store at least one instruction that when executed by the processor causes the processor to perform:
provisioning the selected type of data store for the blockchain data that is matched to perform the one or more analytic processes, and wherein the primary type of data analytic is based on one or more of predefined rules and computing performance.

* * * * *